United States Patent [19]

Scherowsky et al.

[11] Patent Number: 4,491,532

[45] Date of Patent: Jan. 1, 1985

[54] LIQUID-CRYSTAL MIXTURE WITH A PLEOCHROIC ANTHRAQUINONE DYE, AND METHOD FOR PRODUCING SUCH A DYE

[75] Inventors: Günther Scherowsky; Alexander Möller; Gerd Heppke; Bürkhard Knippenberg, all of Berlin, Fed. Rep. of Germany

[73] Assignee: Siemens Aktiengesellschaft, Berlin and Munich, Fed. Rep. of Germany

[21] Appl. No.: 301,046

[22] Filed: Sep. 10, 1981

[30] Foreign Application Priority Data

Sep. 30, 1980 [DE] Fed. Rep. of Germany ....... 3036895

[51] Int. Cl.³ .................. C09K 3/34; C09B 55/00; C09B 1/16; C09B 1/50
[52] U.S. Cl. .................. 252/299.1; 260/377; 260/378; 260/380; 260/381; 350/349
[58] Field of Search .................. 252/299.1; 350/349; 260/377, 378, 380, 381

[56] References Cited

U.S. PATENT DOCUMENTS

| | | | |
|---|---|---|---|
| 4,032,219 | 6/1977 | Lonstant et al. | 252/299.1 |
| 4,232,950 | 11/1980 | Benham | 252/299.1 |
| 4,273,929 | 6/1981 | Boller et al. | 252/299.1 |
| 4,299,720 | 11/1981 | Osman et al. | 252/299.1 |
| 4,304,683 | 12/1981 | Morinaka et al. | 252/299.1 |
| 4,308,163 | 12/1981 | Aftergut et al. | 252/299.1 |
| 4,360,447 | 11/1982 | Morinaka et al. | 252/299.1 |
| 4,363,743 | 12/1982 | Moeller et al. | 252/299.1 |
| 4,376,715 | 3/1983 | Cognard et al. | 252/299.1 |
| 4,428,858 | 1/1984 | Cognard et al. | 252/299.1 |

FOREIGN PATENT DOCUMENTS

| | | | |
|---|---|---|---|
| 26004 | 4/1981 | European Pat. Off. | 252/299.1 |
| 34832 | 9/1981 | European Pat. Off. | 252/299.1 |
| 38460 | 10/1981 | European Pat. Off. | 252/299.1 |

(List continued on next page.)

OTHER PUBLICATIONS

Cognard, J., et al., Mol. Cryst. Liq. Cryst., vol. 70, pp. 1-19, (1981).
Abstracts: The Eighth International Liq. Cryst. Conf., I-23 and I-24, Kyoto, Japan, (Jun. 30-Jul. 4, 1980).

*Primary Examiner*—Teddy S. Gron
*Attorney, Agent, or Firm*—Millen & White

[57] ABSTRACT

Liquid-crystal mixture with a pleochroic anthraquinone dye of the general formula

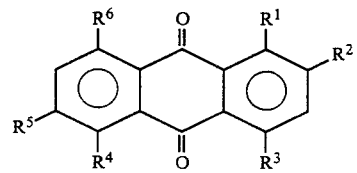

with $R^1$, $R^3$, $R^4$, $R^6$=H, OH, OCH$_3$, NH$_2$, NHCH$_3$, NO$_2$, characterized by the feature that

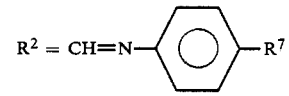

($R^7$=H, alkyl, cycloalkyl, alkoxy, alkylmercapto, amino, alkylamino, dialkylamino, nitro, cyano, halogen),

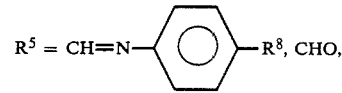

COOR$^9$, CH$_2$—OR$^9$ ($R^8$=H, alkyl, cycloalkyl, alkoxy, alkylmercapto, amino, alkylamino, dialkylamino, nitro, cyano, halogen); $R^9$=H, alkyl and either $R^1$, $R^4$=H, OH, NH$_2$, NHCH$_3$, NO$_2$, NHCH$_3$, NO$_2$, OCH$_3$, where at least one of the two radical is an NH$_2$ or an NHCH$_3$, $R^3$=$R^6$=H, or $R^3$, $R^6$=H, OH, NH$_2$, NHCH$_3$, NO$_2$, OCH$_3$, where at least one of the two radicals is an NH$_2$ or an NHCH$_3$, $R^1$=$R^4$=H.

17 Claims, 6 Drawing Figures

FOREIGN PATENT DOCUMENTS

| | | |
|---|---|---|
| 48887 | 4/1982 | European Pat. Off. ......... 252/299.1 |
| 54217 | 6/1982 | European Pat. Off. ......... 252/299.1 |
| 55842 | 7/1982 | European Pat. Off. ......... 252/299.1 |
| 75173 | 3/1983 | European Pat. Off. ......... 252/299.1 |
| 2815335 | 10/1978 | Fed. Rep. of Germany ... 252/299.1 |
| 3009974 | 9/1980 | Fed. Rep. of Germany ... 252/299.1 |
| 3028593 | 2/1981 | Fed. Rep. of Germany ... 252/299.1 |
| 3038372 | 5/1981 | Fed. Rep. of Germany ... 252/299.1 |
| 55-127485 | 10/1980 | Japan ............................... 252/299.1 |
| 2037803 | 7/1980 | United Kingdom ............. 252/299.1 |
| 2069518 | 8/1981 | United Kingdom ............. 252/299.1 |

FIG 6

LIQUID-CRYSTAL MIXTURE WITH A PLEOCHROIC ANTHRAQUINONE DYE, AND METHOD FOR PRODUCING SUCH A DYE

CROSS-REFERENCE TO RELATED APPLICATION

Application Ser. No. 301,047, filed on Sep. 10, 1981, now abandoned

BACKGROUND OF THE INVENTION

1. Field of the Invention

The invention relates to a liquid-crystal mixture with an anthraquinone derivative and relates further to a method for synthesizing the anthraquinone derivative. A liquid-crystal solution of this kind is described in German Patent Application P 30 07 198.8.

2. Description of the Prior Art

The known dyes which are suitable for liquid-crystal displays absorb only in a relatively limited range of the visible frequency spectrum. They must therefore be mixed together if a black picture or a black background or as large a bright-dark contrast as possible is desired. In practice, the preparation of such mixtures presents considerable difficulties. Again and again it was found that a mixture that has a reasonably acceptable absorption spectrum, is not soluble enough and/or is not stable enough with all its components. These problems are related to the fact that the mixtures examined so far do not have the suitable components.

SUMMARY OF THE INVENTION

It is an object of the present invention to obtain a stable red dye of the anthraquinone type mentioned at the outset, which furnishes strong color contrasts. In addition the use of this red dye makes possible usable achromatic mixtures with at most three components. Furthermore, the red dye can be synthesized without special effort.

With the foregoing and other objects in view, there is provided in accordance with the invention a liquid-crystal mixture with a pleochroic anthraquinone dye of the general formula wherein $R^1$, $R^3$, $R^4$ and $R^6$ are selected from the group consisting of H, OH, OCH$_3$, NH$_2$, NHCH$_3$ and NO$_2$, the combination wherein $R^2$ is CH=N—⟨ ⟩—$R^7$ in which $R^7$ is selected from the group consisting of H, alkyl, cycloalkyl, alkoxy, alkylmercapto, amino, alkylamino, dialkylamino, nitro, cyano and halogen, $R^5$ is

CH=N—⟨ ⟩—$R^8$,

CHO, COOR$^9$, CH$_2$—OR$^9$ in which $R^8$ is selected from the group consisting of H, alkyl, cycloalkyl, alkoxy, alkylmercapto, amino, alkylamino, dialkylamino, nitro, cyano and halogen, and in which $R^9$ is selected from the group consisting of H and alkyl and either $R^1$ and $R^4$ are selected from the group consisting of H, OH, NH$_2$, NHCH$_3$, NO$_2$ and OCH$_3$, where at least one of the two radicals is an NH$_2$ or an NHCH$_3$, $R^3$ and $R^6$ each is H, or wherein $R^3$ and $R^6$ are selected from the group consisting of H, OH, NH$_2$, NHCH$_3$, NO$_2$ and OCH$_3$, where at least one of the two radicals is an NH$_2$ or an NHCH$_3$, $R^1$ and $R^4$ each is H.

Other features which are considered as characteristic for the invention are set forth in the appended claims.

Although the invention is illustrated and described herein as embodied in a liquid-crystal mixture with a pleochroic anthraquinone dye, and method for producing such a dye, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

Liquid crystals with particularly good anthraquinones of the above formula are characterized by the feature that $R^1 = R^4 = NH_2$ and $R^2 = R^5$; the feature that $R^7 = C_nH_{2n+1}$ in which n is an integer not greater than 8, preferably n is 0 or 4; the feature that $R^1 = R^4 = NH_2$ and $R^5 = CHO$ and $R^7 = C_nH_{2n+1}$ in which n is an integer not greater than 8, preferably 4.

Liquid-crystal solutions can be formed in which it contains additionally a yellow and a blue dye, where the mixture formed by the three dyes is achromatic, and preferably, one of the two additional dyes is an anthraquinone.

In a specific embodiment of this mixture containing three dyes, the yellow dye is 1,5-dihydroxy-2(methoxyphenyl) anthraquinone; the blue dye is 1,5-diamino-4,8-dihydroxy-3,7-di(4-methoxyphenyl) anthraquinone; and the third dye is 1,5-diamino-2,6-di(phenylimino-methyl)anthraquinone, where the three dyes have a mutual weight ratio of 1:0.1 to 1.3:0.2 to 0.4, and in particular, about 1:1:0.33.

The dye of the liquid-crystal mixture wherein $R^7 = C_nH_{2n+1}$ and n is 0 may be prepared as follows: 1,5-dinitro-2,6-dimethyl anthraquinone is dissolved in acetic acid, acetanhydride and concentrated sulfuric acid, reacted with chromium trioxide at temperatures around 0° C., and the solution is poured on ice and is extracted. The diacetate obtained is subsequently reduced in an aqueous sodium sulfide solution. After processing, the diacetate is hydrolized by heating in concentrated hydrochloric acid. Thereupon, after drying in a vacuum, the product obtained is heated for several hours in aniline to which some potassium carbonate was added. Finally, the dark-red crystals which were precipitated from the hot-filtered solution, are purified by chromatography on silica gel.

A method of producing the dye of the liquid-crystal mixture wherein $R^7 = C_nH_{2n+1}$ and n=4 is as follows: 1,5-diamino-2,6-dimethyl anthraquinone is stirred for several hours under reflux boiling with nitrobenzene; the corresponding aniline and potassium carbonate and the dark-red crystals, which are precipitated from the cold solution, are suctioned off, washed with chlorobenzene and finally, purified by chromatography on silica gel.

The proposed solution will now be explained in greater detail with the aid of several preferred embodiment examples in conjunction with the attached drawings.

RED EXAMPLE 1

1,5-diamino-2,6-di(phenylimino-methyl)anthraquinone

Synthesis:

3.26 g (0.01 mol) 1,5-dinitro-2,6-dimethyl anthraquinone are dissolved in 16 ml acetic acid, 20 ml acetanhydride and 3 ml concentrated sulfuric acid and are reacted batch-wise with chromium trioxide at 0° C. The solution is poured on ice and extracted. The diacetate obtained is reduced in aqueous sodium sulfide solution and hydrolized after the processing by heating in concentrated hydrochloric acid. After drying in a vacuum for 4 hours in aniline, to which some potassium carbonate had been added, the product obtained is heated. Dark-red crystals are precipitated from the hot-filtered solution, which crystals are purified by chromatography on silica gel.

MS (160° C.):m/e=444 (15%, M+), 340 (7%, M—C$_7$H$_6$N) $^1$H—NMR:(CDCl$_3$)δ=7.15 (s, br, 10H, Ar—H); 7.5 (s, br, 4H, Ar—H); 8.45 (s, 2H, Ar—CH=N—); 9.9 (s, br, 4H, —NH$_2$)

$\lambda_{max}$(CHCl$_3$): 540 nm

S=0.69 (in "ROTN 404" of Hoffmann-La Roche)

Figure 1:
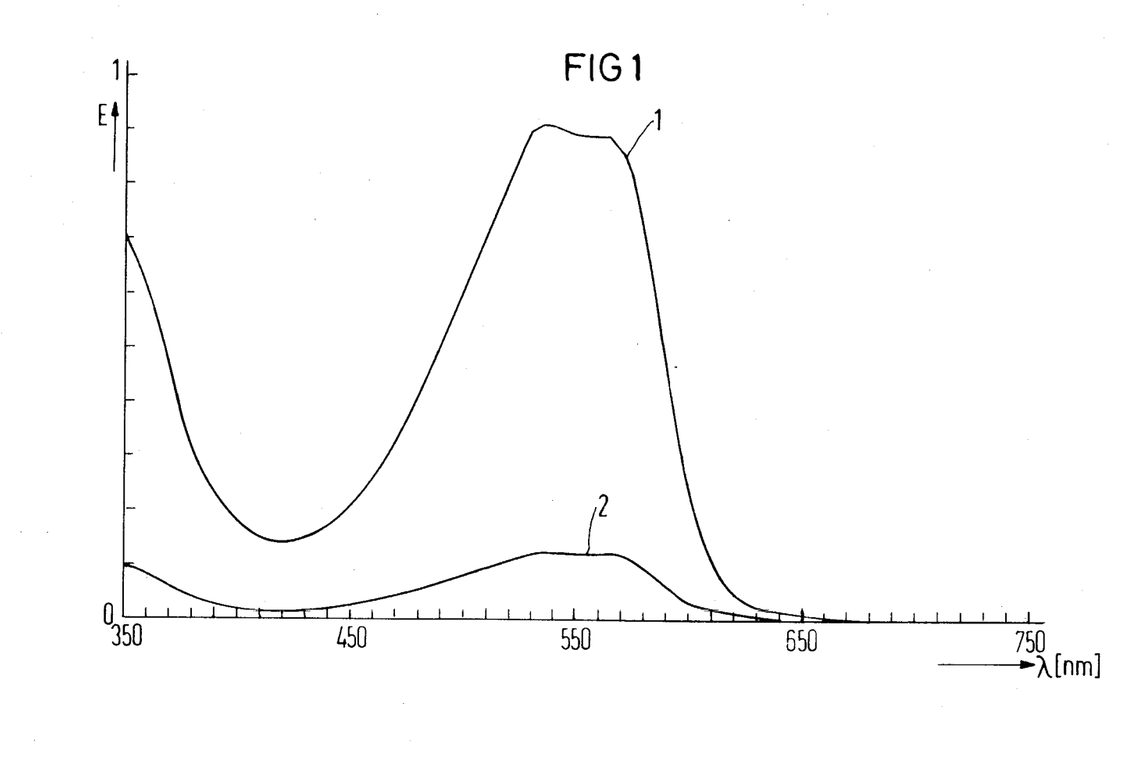
FIG. 1 shows the extinction spectra of a first red liquid-crystal solution for light which is polarized in one case parallel and in the other case perpendicularly to the director of the homogeneously aligned liquid-crystal solution.

The absorption behavior of this compound can be seen from FIG. 1. There, the extinction E, to which passing light is subjected, is plotted versus the wavelength λ. A layer 36 μm thick which consisted of the liquid-crystal substance "ZLI 1132" (Merck) with a content of 0.3% by weight 1,5-diamino-2, 6-di(-phenylimino-methyl)anthraquinone was measured. The liquid-crystal molecules and thereby, also the embedded dye molecules had a uniform preferred direction and the light was polarized in one case parallel and in the other case perpendicularly to this direction. The corresponding extinction spectra are shown in the diagram as curves 1 and 2, respectively. The locations in the chromaticity diagram calculated from the spectra are given in FIG. 2. This figure shows the chromaticity diagram in the usual manner with orthogonal coordinates.

Figure 2:
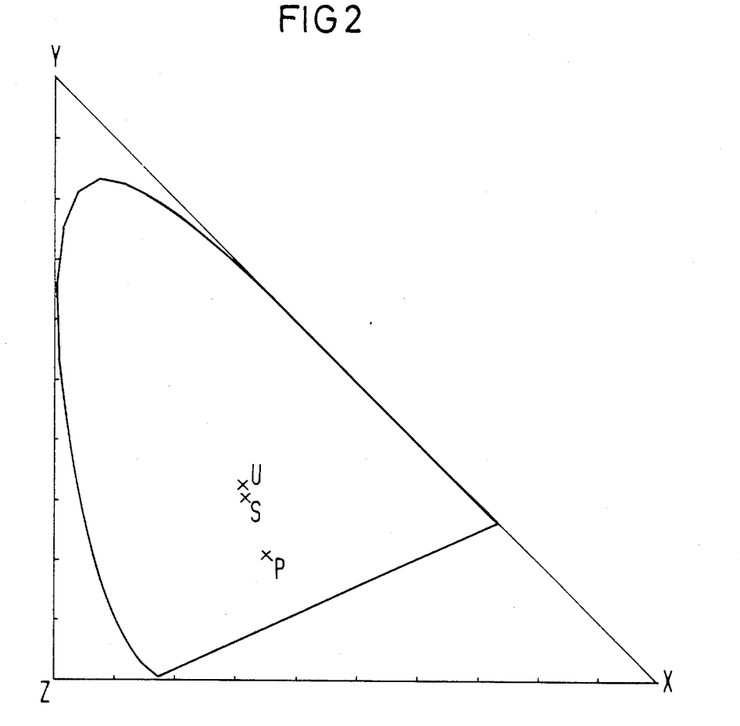
FIG. 2 shows the coordinates in the chromaticity diagram which correspond to the spectra from FIG. 1 and standard light source D65.

The chromaticity diagram encloses three points: the achromatic point "X$_U$", the point "X$_P$" which was determined from curve 1, and the point "X$_S$" belonging to curve 2. The coordinates of these points were calculated using standard light source D65.

RED EXAMPLE 2

1,5-diamino-2,6-di(4-butylphenylimino-methyl)anthraquinone

Synthesis:

2.66 g 1,5-diamino-2,6-dimethyl anthraquinone are vigorously stirred with 30 ml nitrobenzene, 3 ml n-butylaniline and 3 g potassium carbonate for 6 hours with reflux boiling. From the cooled-down solution, dark-red crystals are precipitated which are suctioned-off, post-washed with chlorobenzene and subsequently chromatographized on silica gel. $^1$H—NMR:(CDCl$_3$)δ=0.95 (t, J=7Hz, 6H, CH$_2$—CH$_3$); 1.25-1.75 (m, 8H, —CH$_2$—CH$_2$); 2.55 (t, J=7Hz, 4H, Ar—CH$_2$); 7.15 (s, br, 8H, Ar—H); 7.5 (s, br, 4H, Ar—H); 8.45 (s, 2H, Ar—CH=N—); 9.9 (s, br, 4H, NH$_2$).

$\lambda_{max}$(CHCl$_3$): 540 nm  S=0.72 (in "ROTN 404")

RED EXAMPLE 3

1,5-diamino-2,6-di(4-butoxyphenylimino-methyl)anthraquinone

Synthesis:
Analogous to Red Example 2

$^1$H—NMR:(CDCl$_3$)δ = 1.0 (t, J = 7Hz, 6H, CH$_2$—CH$_3$); 1.3–1.8 (m, 8H, —CH$_2$—CH$_2$); 3.9 (t, J = 7Hz, 4H, —O—CH$_2$); 6.85 (d, J = 8Hz, 4H, Ar—H); 7.2 (d, J = 8Hz, 4H, Ar—H); 7.5 (s, br, 4H, AR—H); 8.45 (s, 2H, Ar—CH=N—); 9.9 (s, br, 4H, NH$_2$);

λ$_{max}$(CHCl$_3$): 540 nm
S = 0.74 (in "ROTN 404")

RED EXAMPLE 4

1,5-diamino-6-(4-butylphenylimino-methyl)anthraquinone-2-carbaldehyde

Synthesis:
In the preparation of the Red Example 2, this compound is chromatographically isolated as a second product.

$^1$H-NMR(CDCl$_3$)δ = 0.95 (t, J = 7Hz, 3H, CH$_2$—CH$_3$); 1.20–1.75 (m, 4H, —CH$_2$—CH$_2$—); 2.55 (t, J = 7Hz, 2H, Ar—CH$_2$—); 7.15 (s, br, 4H); 8.4 (s, 1H, Ar—CH =N—); 9.86 (s, br, 5H, NH$_2$, CHO)

λ$_{max}$(CHCl$_3$) = 537 nm
S = 0.79 (in "ROTN 404")

Figure 3:
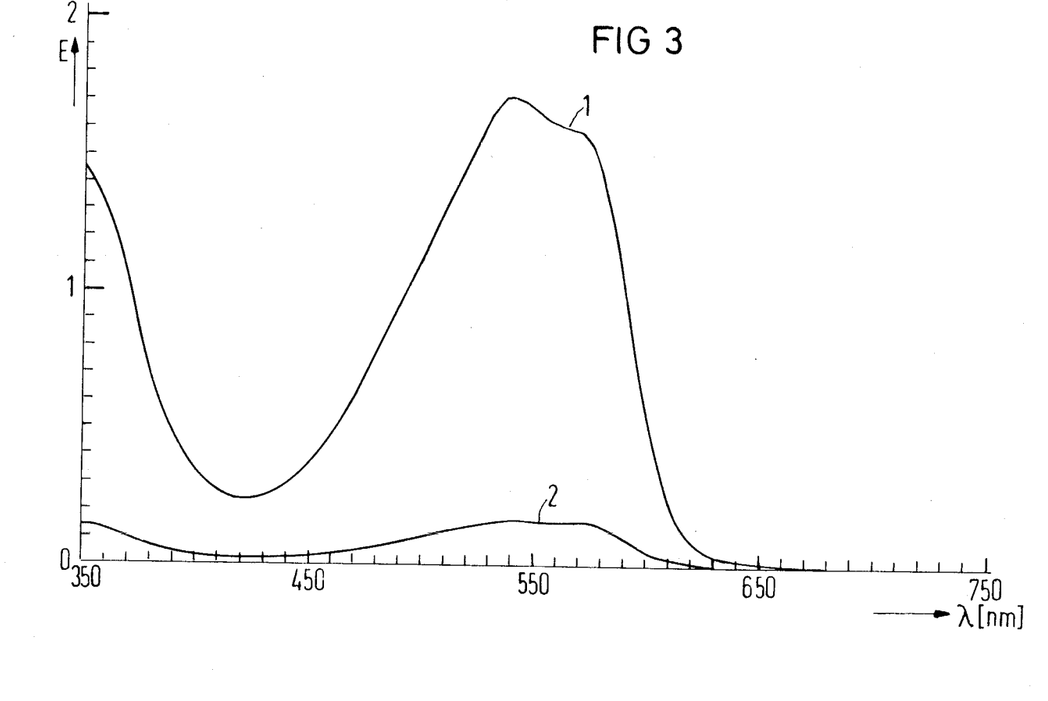
FIG. 3 shows the extraction spectra of a second red liquid crystal solution.
Figure 4:
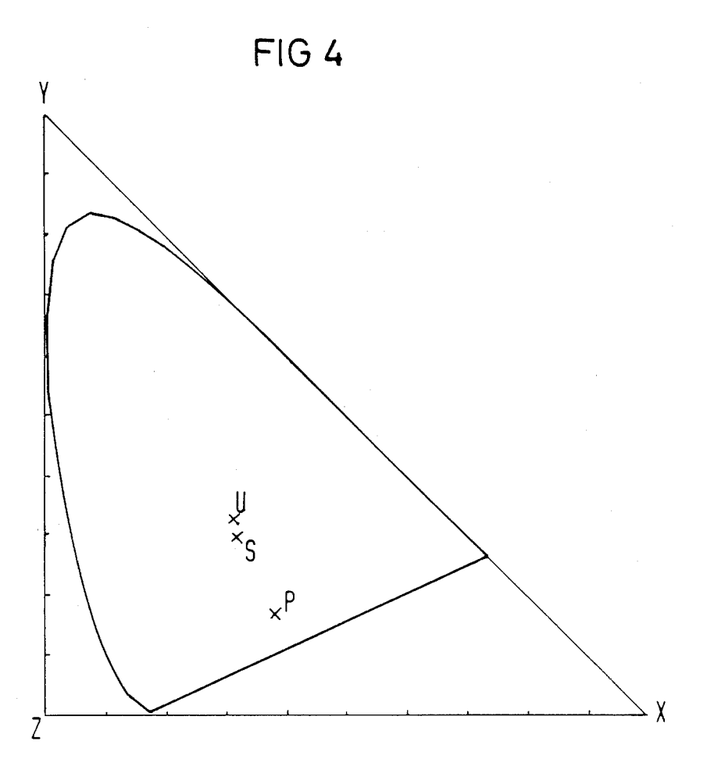
FIG. 4 shows the coordinates in the chromaticity diagram corresponding to the spectra of FIG. 3.

FIG. 3 shows the extinction spectra of a "ZLI 1132" layer 36 μm thick with 0.5% by weight 1,5-diamino-6-(4-butyl phenylimino-methyl)anthraquinone-2-carbaldehyde. The corresponding coordinates in the chromaticity diagram are shown in FIG. 4.

ACHROMATIC EXAMPLE

Figure 5:
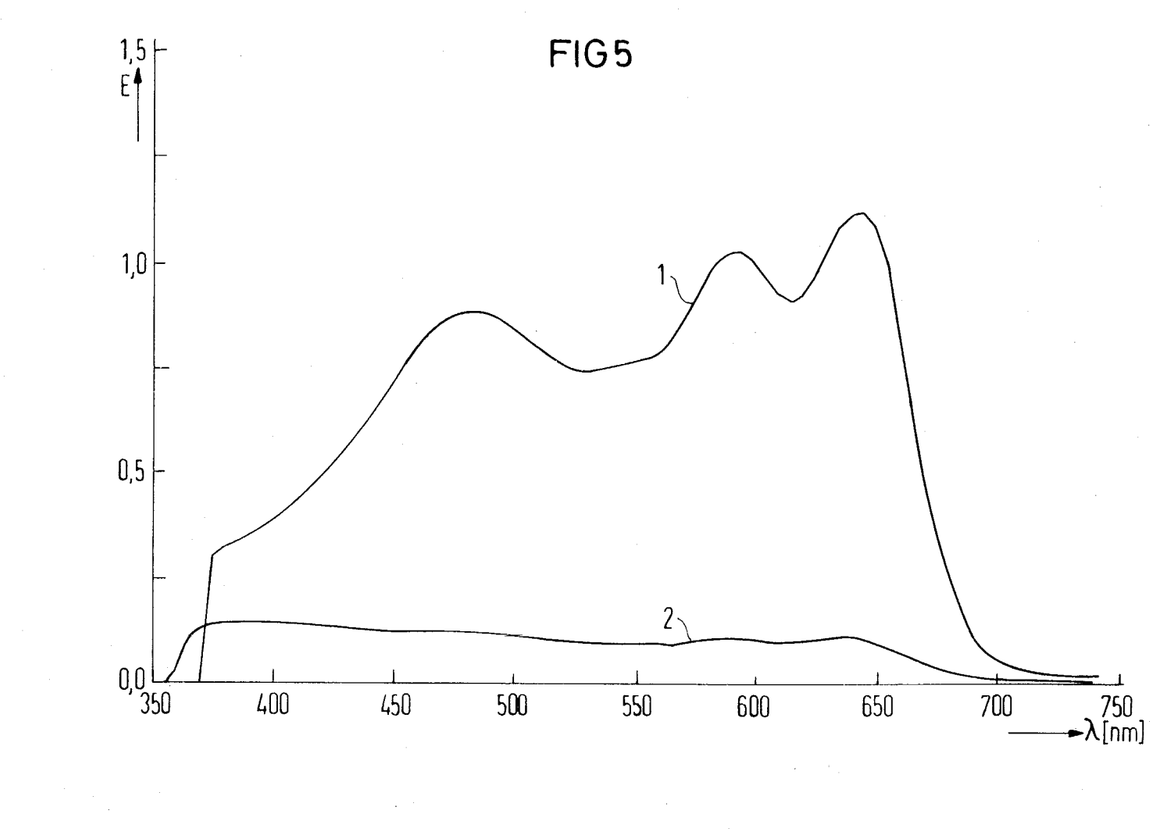
FIG. 5 shows the extinction spectra of an achromatic liquid-crystal solution.
Figure 6:
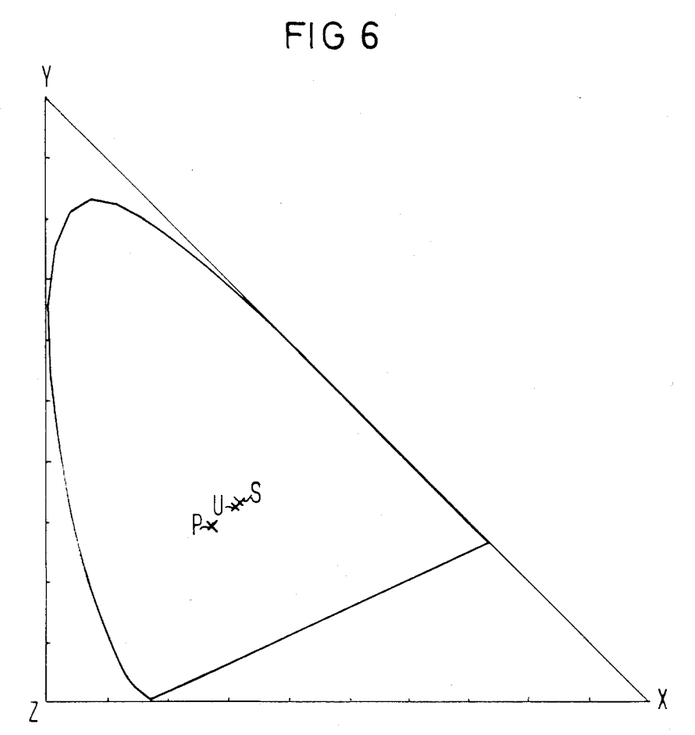
FIG. 6 shows the corresponding coordinates in the chromaticity diagram.

1,5-diamino-2,6-di(phenylimino-methyl)anthraquinone makes, together with the yellow dye 1,5-dihydroxy-2-methoxyphenylanthraquinone and the blue dye 1,5-diamino-4,8-dihydroxy-3,7-di-(4-methoxyphenyl)anthraquinone, achromatic mixtures if yellow, blue and red have a mutual weight ratio of 1:0.8 to 1.3:0.2 to 0.4. If the mixing ratio is varied within the given solubility limits for instance, there is obtained an optimum addition spectrum for a "ROTN 404" layer 36 μm thick, if the yellow dye is dissolved with 0.3% by weight, the blue dye with 0.3% by weight and the red dye with 0.1% by weight in the liquid-crystal layer. FIG. 5 shows the measured extinction curves and FIG. 6, the corresponding coordinates in the chromaticity diagram.

There are claimed:

1. Liquid-crystal system comprising a pleochroic anthraquinone dye dissolved in a liquid crystal material, said dye represented by the general formula wherein R$^1$, R$^3$, R$^4$ and R$^6$ are selected from the group consisting of H, OH, OCH$_3$, NH$_2$, NHCH$_3$ and NO$_2$, the combination wherein in which R$^7$ is selected from the group consisting of H, alkyl, cycloalkyl, alkoxy, alkylmercapto, amino, alkylamino, dialkylamino, nitro, cyano and halogen, CHO, COOR$^9$, CH$_2$—OR$^9$ in which R$^8$ is selected from the group consisting of H, alkyl, cycloalkyl, alkoxy, alkylmercapto, amino, alkylamino, dialkylamino, nitro, cyano and halogen, and in which R$^9$ is selected from the group consisting of H and alkyl, and either wherein R$^1$ and R$^4$ are selected from the group consisting of H, OH, NH$_2$, NHCH$_3$, NO$_2$ and OCH$_3$, where at least one of the two radicals is an NH$_2$ or an NHCH$_3$, R$^3$ and R$^6$ each is H, or wherein R$^3$ and R$^6$ are selected from the group consisting H, OH, NH$_2$, NHCH$_3$, NO$_2$ and OCH$_3$, where at least one of the two radicals is an NH$_2$ or an NHCH$_3$, R$^1$ and R$^4$ each is H.

2. Liquid-crystal system according to claim 1, wherein R$^1$ and R$^4$ each is NH$_2$ and wherein R$^2$=R$^5$.

3. Liquid-crystal system according to claim 2, wherein $R^7 = C_nH_{2n+1}$ and wherein n is an integer not greater than 8.

4. Liquid-crystal system according to claim 3, wherein n = 0.

5. Liquid-crystal system according to claim 3, wherein n = 4.

6. Liquid-crystal system according to claim 2, wherein $R^7 = -O-C_nH_{2n+1}$ and wherein n is an integer not greater than 8.

7. Liquid-crystal system according to claim 6, wherein n = 4.

8. Liquid-crystal system according to claim 1, wherein R$^1$ and R$^4$ each is NH$_2$, $R^7 = C_nH_{2n+1}$ in which n is an integer not greater than 8, and R$^5$ = CHO.

9. Liquid-crystal system according to claim 8, wherein n = 4.

10. Liquid-crystal system according to claim 1 wherein the mixture of the pleochroic anthraquinone dye in liquid crystal material contains additionally a yellow and blue dye, and where the mixture formed by the three dyes in achromatic.

11. Liquid-crystal system according to claim 10, wherein one of the two additional dyes is an anthraquinone.

12. Liquid-crystal system according to claim 2 wherein the mixture of the pleochroic anthraquinone dye in liquid crystal material contains additionally a yellow and a blue dye, and where the mixture formed by the three dyes is achromatic.

13. Liquid-crystal system according to claim 3 wherein the mixture of the pleochroic anthraquinone dye in liquid crystal material contains additionally a yellow and a blue dye, and where the mixture formed by the three dyes is achromatic.

14. Liquid-crystal system according to claim 6 wherein the mixture of the pleochroic anthraquinone dye in liquid crystal material contains additionally a yellow and a blue dye, and where the mixture formed by the three dyes is achromatic.

15. Liquid-crystal system according to claim 8 wherein the mixture of the pleochroic anthraquinone dye in liquid crystal material contains additionally a yellow and a blue dye, and where the mixture formed by the three dyes is achromatic.

16. Liquid-crystal mixture according to claim 10, wherein the yellow dye is 1,5-dihydroxy-2-(methoxyphenyl) anthraquinone; the blue dye is 1,5-diamino-4,8-dihydroxy-3,7-di(4-methoxyphenyl)anthraquinone; and the third dye is 1,5-diamino-2,6-di(phenyliminomethyl) anthraquinone, where the three dyes have a mutual weight ratio of 1:0.8 to 1.3:0.2 to 0.4.

17. Liquid crystal mixture according to claim 16, wherein the weight ratio is about 1:1:0.33.

* * * * *